(12) United States Patent
Onitsuka et al.

(10) Patent No.: US 11,292,089 B2
(45) Date of Patent: *Apr. 5, 2022

(54) RESIN COMPOSITION FOR SOLDERING, RESIN FLUX CORED SOLDER, FLUX COATED SOLDER, AND LIQUID FLUX

(71) Applicant: SENJU METAL INDUSTRY CO., LTD., Tokyo (JP)

(72) Inventors: Motohiro Onitsuka, Tokyo (JP); Yoko Kurasawa, Tokyo (JP); Hiroyoshi Kawasaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/960,002

(22) PCT Filed: Jan. 15, 2019

(86) PCT No.: PCT/JP2019/000970
§ 371 (c)(1),
(2) Date: Jul. 2, 2020

(87) PCT Pub. No.: WO2019/142795
PCT Pub. Date: Jul. 25, 2019

(65) Prior Publication Data
US 2020/0391329 A1  Dec. 17, 2020

(30) Foreign Application Priority Data
Jan. 17, 2018  (JP) .............................. JP2018-005918

(51) Int. Cl.
| | | |
|---|---|---|
| C08L 93/04 | (2006.01) | |
| C08K 5/521 | (2006.01) | |
| C08K 5/17 | (2006.01) | |
| C08K 5/092 | (2006.01) | |
| C08K 5/3492 | (2006.01) | |
| B23K 35/362 | (2006.01) | |
| B23K 35/36 | (2006.01) | |
| B23K 35/26 | (2006.01) | |
| C22C 13/00 | (2006.01) | |

(52) U.S. Cl.
CPC .......... *B23K 35/362* (2013.01); *B23K 35/262* (2013.01); *B23K 35/3613* (2013.01); *C08K 5/092* (2013.01); *C08K 5/17* (2013.01); *C08K 5/34924* (2013.01); *C08K 5/521* (2013.01); *C08L 93/04* (2013.01); *C22C 13/00* (2013.01)

(58) Field of Classification Search
CPC combination set(s) only.
See application file for complete search history.

(56) References Cited

U.S. PATENT DOCUMENTS

| | | | |
|---|---|---|---|
| 3,157,681 A | 11/1964 | Fischer | |
| 4,617,134 A | 10/1986 | Shaub | |
| 6,414,055 B1 | 7/2002 | Lauzon | |
| 10,857,630 B2 | 12/2020 | Takagi et al. | |
| 2004/0220308 A1* | 11/2004 | Paul ..................... C09J 153/02 524/270 |
| 2005/0230457 A1 | 10/2005 | Kay et al. | |
| 2006/0011267 A1 | 1/2006 | Kay et al. | |
| 2008/0135133 A1 | 6/2008 | Hagiwara | |
| 2012/0094212 A1 | 4/2012 | Hasegawa et al. | |
| 2018/0257182 A1 | 9/2018 | Kajikawa et al. | |

FOREIGN PATENT DOCUMENTS

| | | |
|---|---|---|
| CN | 111587163 A | 8/2020 |
| DE | 102007007212 A1 | 8/2008 |
| DE | 102009033406 A1 | 1/2011 |
| EP | 1857091 A1 | 11/2007 |
| JP | S57108194 A | 7/1982 |
| JP | H07258593 A | 10/1995 |
| JP | 2004300399 A | 10/2004 |
| JP | 2007532321 A | 11/2007 |
| JP | 201121176 A | 2/2011 |
| JP | 2013169557 A | 9/2013 |
| JP | 2013173184 A | 9/2013 |
| JP | 2014185298 A | 10/2014 |
| JP | 2015142936 A | 8/2015 |
| JP | 2017064761 A | 4/2017 |

(Continued)

OTHER PUBLICATIONS

Machine translation of JP2015142936 (Year: 2015).*
PubChem (Fatty acids, C18-unsatd., dimers, https://pubchem.ncbi.nlm.nih.gov/compound/Fatty-acids_-C18-unsatd._-dimers (Year: 2021).*
International Search Report (in English and Japanese) issued in PCT/JP2019/000970, dated Apr. 9, 2019; ISA/JP.
UnivarSolutions, "Not All Dimer Acids are Created Equal", Jan. 8, 2018; Univar USA, Inc.
International Search Report (in English and Japanese) issued in PCT/JP2018/037764, dated Dec. 25, 2018; ISA/JP.

* cited by examiner

*Primary Examiner* — Wenwen Cai
(74) *Attorney, Agent, or Firm* — Harness, Dickey & Pierce, P.L.C.

(57) ABSTRACT

A resin composition for soldiering is provided. The resin composition includes 1 wt % or more and 40 wt % or less of a dimer acid, a trimer acid, or a combination thereof, 30 wt % or more and 99 wt % or less of a rosin, and 0 wt % or more and 13 wt % or less of a solvent. The dimer acid is selected from a dimer acid that is a reaction product of oleic acid and linoleic acid, a hydrogenated dimer acid obtained by adding hydrogen to a dimer acid that is a reaction product of oleic acid and linoleic acid, and a combination thereof. The trimer acid is selected from a trimer acid that is a reaction product of oleic acid and linoleic acid, a hydrogenated trimer acid obtained by adding hydrogen to a trimer acid that is a reaction product of oleic acid and linoleic acid, and a combination thereof.

3 Claims, No Drawings

(56) References Cited

FOREIGN PATENT DOCUMENTS

| | | |
|---|---|---|
| JP | 2017088827 A | 5/2017 |
| JP | 2017113776 A | 6/2017 |
| JP | 20188287 A | 1/2018 |
| JP | 6338007 B1 | 6/2018 |
| JP | 6399242 B1 | 10/2018 |
| WO | WO-2006025224 A1 | 3/2006 |
| WO | WO-2017/047694 A1 | 3/2017 |

ND SOLDER, FLUX
RESIN COMPOSITION FOR SOLDERING, RESIN FLUX CORED SOLDER, FLUX COATED SOLDER, AND LIQUID FLUX

CROSS-REFERENCE TO RELATED APPLICATIONS

This application is the U.S. National Phase Application under 35 U.S.C. 371 of International Application No. PCT/JP2019/000970, filed on Jan. 15, 2019, which claims the benefit of priority from Japanese Patent Application No. 2018-005918, filed on Jan. 17, 2018. The above applications are incorporated herein by reference in their entirety.

TECHNICAL FIELD

The present invention relates to a resin composition for soldering, a resin flux cored solder and a flux coated solder using the resin composition for soldering, and a liquid flux.

BACKGROUND ART

Generally, a flux used for soldering chemically removes a metal oxide present on a solder and the metal surfaces of a joining object to be soldered, and has the effect of enabling a metal element to move in the boundary between the both. Thus, soldering using the flux can form an intermetallic compound between the solder and the metal surface of the joining object to provide a strong joining.

In conventional fluxes, an organic acid such as dicarboxylic acid has been used as an activator for chemically removing metal oxides. For example, a technique using a dimer acid as an activator in a flux has been proposed (for example, refer to PTL 1).

PTL 1 discloses a flux supposed to be used for a resin flux cored solder. The resin flux cored solder is obtained by filling a linear solder with a flux. The flux used for the resin flux cored solder is required to be solid or high viscosity state from the viewpoint of processability. The flux which is solid or high viscosity state is also referred to as a resin composition.

CITATION LIST

Patent Literature

PTL 1: Japanese Patent Laid-Open No. 2017-113776

SUMMARY OF INVENTION

Technical Problem

A dimer acid is a dicarboxylic acid obtained by dimerizing a monocarboxylic acid and various monocarboxylic acids are present, and hence properties of the dimer acid vary greatly depending on the number of carbon atoms, degree of unsaturation (number of double bonds), and structure thereof. Thereby, for example, even at the same number of carbon atoms, the dimer acid structure becomes completely different due to the difference in the degree of unsaturation.

Even with the same combination of the flux and the solder material such as the resin flux cored solder, the finish after soldering such as the wetting and spreading properties may be completely different due to the difference in the heat history. Furthermore, even when the same amount of organic acid is added in formulation of the flux, the reliability such as the specific resistance of an aqueous solution which affects the corrosiveness of the metal can be significantly changed. Therefore, stable and good-finish soldering through any heat history is required, and the high reliability thereof is ideal. Furthermore, as a matter of course, good processability is required.

The present invention has been made to solve such problems, and an object of the present invention is to provide a resin composition for soldering with not only improved wetting and spreading properties and but also excellent reliability and processability, a resin flux cored solder and a flux coated solder using this resin composition for soldering, and a liquid flux.

Solution to Problem

It has been found that a dimer acid which is a reaction product of oleic acid and linoleic acid, the hydrogenated product thereof, a trimer acid which is a reaction product of oleic acid and linoleic acid, and the hydrogenated product thereof have heat resistance and a solder wets and spreads well.

The present invention is a resin composition for soldering including 1 wt % or more and 40 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or a total of two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and 30 wt % or more and 99 wt % or less of a rosin.

In the present invention, 0 wt % or more and 4 wt % or less of an organic acid, 0 wt % or more and 2 wt % or less of an amine, 0 wt % or more and 5 wt % or less of an organic halogen compound, and 0 wt % or more and 1 wt % or less of an amine hydrohalide salt may be included. 0 wt % or more and 13 wt % or less of a solvent may also be included. 0 wt % or more and 3% wt or less of an antifoaming agent, 0 wt % or more and 5 wt % or less of a silicone oil, and 0 wt % or more and 10 wt % or less of an organophosphorus compound may also be included. 0 wt % or more and 40 wt % or less of another resin may also be included.

The present invention is also a resin flux cored solder obtained by filling a linear solder with the above resin composition for soldering, a flux coated solder obtained by coating a solder with the above resin composition for soldering, and liquid flux consisting of the above resin composition for soldering and a solvent.

Advantageous Effects of Invention

The present invention exhibits good wetting and spreading of a solder by including 1 wt % or more and 40 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or a total of two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and 30 wt % or more and 99 wt % or less of a rosin. In addition, the specific resistance of the aqueous solution can be maintained, and the reliability can be improved. Furthermore, processability is improved.

DESCRIPTION OF EMBODIMENTS

<An Example of Resin Composition for Soldering of the Present Embodiment>

A resin composition for soldering of the present embodiment includes any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and a rosin.

The dimer acid of the present embodiment is a reaction product of oleic acid and linoleic acid, and is a dimer having 36 carbon atoms. In addition, the trimer acid of the present embodiment is a reaction product of oleic acid and linoleic acid, and is a trimer having 54 carbon atoms. The dimer acid and the trimer acid of the present embodiment, which are a reaction product of oleic acid and linoleic acid, have heat resistance in a temperature range assumed for soldering and function as an activator in soldering.

An amount of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid is small, resulting in lack of the activity for chemically removing metal oxides.

On the other hand, an amount of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid is large, causing a resin composition for soldering at room temperature to be liquid. The resin composition for soldering which is liquid at room temperature (normal temperature) may be unsuitable for use as a resin flux cored solder.

Thus, the resin composition for soldering of the present embodiment includes 1 wt % or more and 40 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or a total of two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid.

The resin composition for soldering of the present embodiment includes 30 wt % or more and 99 wt % or less of a rosin. 0 wt % or more and 40 wt % or less of another resin may also be included. The resin composition for soldering of the present embodiment further includes 0 wt % or more and 4 wt % or less of another organic acid, 0 wt % or more and 2 wt % or less of an amine, 0 wt % or more and 5 wt % or less of an organic halogen compound, and 0 wt % or more and 1 wt % or less of an amine hydrohalide salt as an activator.

The resin composition for soldering of the present embodiment further includes 0 wt % or more and 13 wt % or less of a solvent. The resin composition for soldering of the present embodiment further includes 0 wt % or more and 3 wt % or less of an antifoaming agent, 0 wt % or more and 5 wt % or less of a silicone oil, and 0 wt % or more and 10 wt % or less of an organophosphorus compound as an additive. One or more of other solvents, surfactants, and antioxidants may be included as an additive.

Examples of the rosin include raw rosins such as a gum rosin, a wood rosin, and a tall oil rosin, and a derivative obtained from the raw rosin. Examples of the derivative include: a purified rosin, a hydrogenated rosin, a disproportionated rosin, a polymerized rosin, an acid-modified rosin, a phenol-modified rosin, and a $\alpha,\beta$-unsaturated carboxylic acid-modified product (acrylated rosin, maleated rosin, fumarated rosin, etc.); a purified product, a hydrogenated product, and a disproportionated product of the polymerized rosin; and a purified product, a hydrogenated product, and a disproportionated product of the $\alpha,\beta$-unsaturated carboxylic acid-modified product, and one or two or more of these may be used.

The flux for soldering of the present embodiment may further include another resin in addition to a rosin, and can further include, as another resin, at least one or more of resins selected from a terpene resin, a modified terpene resin, a terpene phenol resin, a modified terpene phenolic resin, a styrene resin, a modified styrene resin, a xylene resin, a modified xylene resin, polyethylene, polypropylene, polyvinyl acetate, polyvinyl alcohol, polyethylene polypropylene copolymer, and polyethylene polyvinyl acetate copolymer. An aromatic modified terpene resin, a hydrogenated terpene resin, a hydrogenated aromatic modified terpene resin, or the like can be used as the modified terpene resin. A hydrogenated terpene phenol resin or the like can be used as the modified terpene phenol resin. A styrene acrylic resin, a styrene maleic acid resin, or the like can be used as the modified styrene resin. A phenol-modified xylene resin, an alkylphenol-modified xylene resin, a phenol-modified resol-type xylene resin, a polyol-modified xylene resin, a polyoxyethylene-added xylene resin, or the like can be used as the modified xylene resin. The amount of the another resin is preferably 40 wt % or less, and more preferably 25 wt % or less.

Examples of the another organic acid include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, p-hydroxyphenylacetic acid, picolinic acid, phenylsuccinic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid, and linolenic acid.

Examples of the another organic acid include as a dimer acid other than the reaction product of oleic acid and linoleic acid, a trimer acid other than the reaction product of oleic acid and linoleic acid, a hydrogenated dimer acid obtained by adding hydrogen to a dimer acid other than the reaction product of oleic acid and linoleic acid or a hydrogenated trimer acid obtained by adding hydrogen to a trimer acid other than the reaction product of oleic acid and linoleic acid: a dimer acid which is a reaction product of acrylic acid, a trimer acid which is a reaction product of acrylic acid, a dimer acid which is a reaction product of methacrylic acid, a trimer acid which is a reaction product of methacrylic acid, a dimer acid which is a reaction product of acrylic acid and methacrylic acid, a trimer acid which is a reaction product of acrylic acid and methacrylic acid, a dimer acid which is a reaction product of oleic acid, a trimer acid which is a reaction product of oleic acid, a dimer acid which is a reaction product of linoleic acid, a trimer acid which is a reaction product of linoleic acid, a dimer acid which is a reaction product of linolenic acid, a trimer acid which is a reaction product of linolenic acid, a dimer acid which is a reaction product of acrylic acid and oleic acid, a trimer acid which is a reaction product of acrylic acid and oleic acid, a dimer acid which is a reaction product of acrylic acid and linoleic acid, a trimer acid which is a reaction product of acrylic acid and linoleic acid, a dimer acid which is a reaction product of acrylic acid and linolenic acid, a trimer acid which is a reaction product of acrylic acid and linolenic acid, a dimer acid which is a reaction product of methacrylic acid and oleic acid, a trimer acid which is a reaction product of methacrylic acid and oleic acid, a dimer acid which is a reaction product of methacrylic acid and linoleic acid, a trimer acid which is a reaction product of methacrylic acid and linoleic acid, a dimer acid which is a reaction product of methacrylic acid and linolenic acid, a trimer acid which is a reaction product of methacrylic acid and linolenic acid, a dimer acid which is a reaction product of oleic acid and linolenic acid, a trimer acid which is a reaction product of oleic acid and linolenic acid, a dimer acid which is a reaction product of linoleic acid and linolenic acid, a trimer acid which is a reaction product of linoleic acid and linolenic acid, a hydrogenated dimer acid obtained by adding hydrogen to the above dimer acid other than the reaction product of oleic acid and linoleic acid, and a hydrogenated trimer acid obtained by adding hydrogen to the above trimer acid other than the reaction product of oleic acid and linoleic acid.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 5-phenyltetrazole.

Examples of the organic halogen compound include trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, and bromosuccinic acid, which are organic bromo compounds. Examples thereof also include chloroalkane, chlorinated fatty acid ester, HET acid, and HET anhydride which are organic chloro compounds. Examples thereof also include a fluorinated surfactant, a surfactant having a perfluoroalkyl group, and polytetrafluoroethylene which are organic fluoro compounds.

The amine hydrohalide salt is a compound obtained by reacting an amine with hydrogen halide, and examples thereof include aniline hydrogen chloride and aniline hydrogen bromide. As the amine of the amine hydrohalide salt, the above amine can be used, and examples thereof include ethylamine, ethylenediamine, triethylamine, methylimidazole, and 2-ethyl-4-methylimidazole, and examples of the hydrogen halide include hydrogenated products of chlorine, bromine, iodine, and fluorine (hydrogen chloride, hydrogen bromide, hydrogen iodide, and hydrogen fluoride). A borofluoride may also be included in place of the amine hydrohalide salt or in combination with the amine hydrohalide salt, and examples of the borofluoride include fluoroboric acid.

Examples of the solvent include water, an ester solvent, an alcohol solvent, a glycol ether solvent, and terpineols. Examples of the ester solvent include a fatty acid alkyl, butyl stearate, 2-ethylhexyl stearate, isotridecyl stearate, methyl oleate, isobutyl oleate, coconut fatty acid methyl, methyl laurate, isopropyl myristate, isopropyl palmitate, 2-ethylhexyl palmitate, and octyldodecyl myristate. Examples of the alcohol solvent include ethanol, industrial ethanol (mixed solvent obtained by adding methanol and/or isopropyl alcohol to ethanol), isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, and 2,4,7,9-tetramethyl-5-decyne-4,7-diol. Examples of the glycol ether solvent include hexyldiglycol, diethylene glycol mono-2-ethylhexyl ether, ethylene glycol monophenyl ether, 2-methylpentane-2,4-diol, diethylene glycol monohexyl ether, diethylene glycol dibutyl ether, and triethylene glycol monobutyl ether.

Examples of the antifoaming agent include acrylic polymer, acrylic polymer, vinyl ether polymer, and butadiene polymer.

Examples of the silicone oil include dimethyl silicone oil, cyclic silicone oil, methylphenyl silicone oil, methyl hydrogen silicone oil, higher fatty acid-modified silicone oil, alkyl-modified silicone oil, alkyl-aralkyl-modified silicone oil, amino-modified silicone oil, epoxy-modified silicone oil, polyether-modified silicone oil, alkyl-polyether-modified silicone oil, and carbinol-modified silicone oil.

Examples of the organophosphorus compound include methyl acid phosphate, ethyl acid phosphate, isopropyl acid phosphate, monobutyl acid phosphate, butyl acid phosphate, dibutyl acid phosphate, butoxyethyl acid phosphate, 2-ethylhexyl acid phosphate, bis(2-ethylhexyl)phosphate, monoisodecyl acid phosphate, isodecyl acid phosphate, lauryl acid phosphate, isotridecyl acid phosphate, stearyl acid phosphate, oleyl acid phosphate, tallow phosphate, coconut oil phosphate, isostearyl acid phosphate, alkyl acid phosphate, tetracosyl acid phosphate, ethylene glycol acid phosphate, 2-hydroxyethyl methacrylate acid phosphate, dibutyl pyrophosphate acid phosphate, 2-ethylhexyl phosphonate mono-2-ethylhexyl, and alkyl(alkyl)phosphonate.

<An Example of Configuration of Resin Flux Cored Solder of the Present Embodiment>

A resin flux cored solder of the present embodiment is a linear solder filled with the above resin composition for soldering. The resin composition for soldering used for the resin flux cored solder is required to be solid at room temperature so as not to flow out in the process of processing a solder into a linear shape, or to have a predetermined high viscosity so as not to flow out. The viscosity required for the resin composition for soldering when used for the resin flux cored solder is, for example, 3500 Pa·s or more.

The solder is preferably a Pb-free solder, and is composed of a simple substance of Sn, alloys such as Sn—Ag-based alloy, Sn—Cu-based alloy, Sn—Ag—Cu-based alloy, Sn—Bi-based alloy, and Sn—In-based alloy, or an alloy obtained by adding Sb, Bi, In, Cu, Zn, As, Ag, Cd, Fe, Ni, Co, Au, Ge, P or the like to those alloys.

<An Example of Configuration of Flux Coated Solder of the Present Embodiment>

A flux coated solder of the present embodiment is a solder coated with the above resin composition for soldering. The solder has a sphere shape called a ball or a columnar shape such as a circular cylinder called a column or a pellet. When a solder is coated with the resin composition for soldering, the resin composition for soldering is solid that adheres to the surface of the solder at room temperature.

The solder is preferably a Pb-free solder, and is composed of a simple substance of Sn, alloys such as Sn—Ag-based alloy, Sn—Cu-based alloy, Sn—Ag—Cu-based alloy, Sn—Bi-based alloy, and Sn—In-based alloy, or an alloy obtained by adding Sb, Bi, In, Cu, Zn, As, Ag, Cd, Fe, Ni, Co, Au, Ge, P or the like to those alloys.

<An Example of Configuration of Liquid Flux of the Present Embodiment>

A liquid flux of the present embodiment is obtained by diluting the above resin composition for soldering with a solvent, and is applied to a use in a liquid aspect. When the total amount of the flux is 100, the liquid flux includes 1 wt % or more and 25 wt % or less of the resin composition for soldering and 75 wt % or more and 99 wt % or less of the solvent. The solvent used for the liquid flux is preferably isopropyl alcohol.

<Examples of Effects of Resin Composition for Soldering, Resin Flux Cored Solder, Flux Coated Solder, and Liquid Flux of the Present Embodiment>

The resin composition for soldering including 1 wt % or more and 40 wt % or less of: any of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid; or a total of two or more of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, and a hydrogenated trimer acid obtained by adding hydrogen to a trimer acid which is a reaction product of oleic acid and linoleic acid, and 30 wt % or more and 99 wt % or less of a rosin exhibits an aspect of solid at room temperature or having a predetermined viscosity. Heating to a temperature more than a melting point of the solder reduces the viscosity of the rosin to occur a flow, and evaporation of a dimer acid which is a reaction product of oleic acid and linoleic acid, a trimer acid which is a reaction product of oleic acid and linoleic acid, a hydrogenated dimer acid obtained by adding hydrogen to a dimer acid which is a reaction product of oleic acid and linoleic acid, or a hydrogenated trimer acid obtained by adding hydrogen to a trimer acid which is a reaction product of oleic acid and linoleic acid is suppressed, exhibiting the activity against metal oxides.

Thereby, the resin composition for soldering of the present embodiment can obtain a high activity required for removing metal oxides by being used for a resin flux cored solder and a flux coated solder. The resin composition for soldering of the present embodiment can also obtain a high activity required for removing metal oxides by being applied to a use as liquid, when diluted with a solvent.

EXAMPLES

The resin compositions for soldering in Examples and Comparative Examples were prepared with the compositions shown in Table 1 and Table 2 below, and the wetting and spreading properties of the solder, the specific resistance of an aqueous solution, and the processability were investigated. The composition ratios in Table 1 and Table 2 are wt % (% by weight) when the total amount of the resin composition for soldering is 100.

<Evaluation of Wetting and Spreading Properties of Solder>
(1) Investigation Method For the evaluation of the wetting and spreading properties of the solder, a resin flux cored solder using the resin composition for soldering in Examples and Comparative Examples was prepared as a sample. The solder had a composition expressed as Sn-3Ag-0.5Cu, and included 3.0 wt % of Ag, 0.5 wt % of Cu, and the balance of Sn. The diameter of the resin flux cored solder was ϕ0.8 mm and, when the total amount of the resin flux cored solder was 100, the solder exhibited 97 wt % and the resin composition for soldering exhibited 3 wt %. The wetting and spreading ratio was calculated in accordance with JIS 3197 8.3.1.1 by using this resin flux cored solder.
(2) Criteria
○: Wetting and spreading ratio was 70% or more.
x: Wetting and spreading ratio was less than 70%.

<Evaluation of Specific Resistance of Aqueous Solution>
(1) Investigation Method For the evaluation of the specific resistance of the aqueous solution, a liquid sample was prepared by diluting the resin composition for soldering in Examples and Comparative Examples with isopropyl alcohol. When the total amount of the sample is 100, the resin composition for soldering exhibits 25 wt % and isopropyl alcohol exhibits 75 wt %. Using each sample, the specific resistance of the aqueous solution was measured in accordance with JIS 3197 8.1.1.

A low specific resistance of the aqueous solution indicates that the amount of the ionic substance in the resin composition for soldering is large. When a metal is joined with a resin flux cored solder or the like that uses the resin composition for soldering, the resin composition for soldering remains as a residue at the joined portion. When the amount of the ionic substance in the residue is large, the hygroscopicity increases, leading to corrosion of the joined metal and thereby lowering the reliability. Therefore, a high specific resistance of the aqueous solution is required.
(2) Criteria
○: Specific resistance of aqueous solution was 500 Ωm or more.
x: Specific resistance of aqueous solution was less than 500 Ωm.

<Evaluation of Processability>
(1) Investigation Method

Using the resin composition for soldering in Examples and Comparative Examples as a sample, the state at 25° C. was observed to judge solid or liquid.
(2) Criteria
○: State at 25° C. was solid.
x: State at 25° C. was liquid.

<Comprehensive Evaluation>
○: All of evaluation of wetting and spreading, evaluation of specific resistance of aqueous solution, and evaluation of processability was ○.
x: Any or all of evaluation of wetting and spreading, evaluation of specific resistance of aqueous solution, and evaluation of processability was x.

TABLE 1

| | Material | | Example 1 | Example 2 | Example 3 | Example 4 | Example 3 | Example 6 |
|---|---|---|---|---|---|---|---|---|
| Rosin | Natural rosin | Natural rosin | Bal | Bal | Bal | Bal | Bal | Bal |
| | Modified rosin | Polymerized rosin | | | | | | |
| | | Hydrogenated rosin | | | | | | |
| | | Hydrogenated polymerized rosin | | | | | | |
| | | Acid-modified rosin | | | | | | |
| | | Hydrogenated acid-modified rosin | | | | | | |
| | | Rosin ester | | | | | | |
| | Resin | Polyethylene | | | | | | |
| | | polyvinyl acecute copolymer | | | | | | |
| Activator | Dimer acid | Dimer acid | 10 | 1 | 3 | 25 | | |
| | | Hydrogenated dimer acid | | | | | 10 | |
| | | Trimer acid | | | | | | 10 |
| | | Hydrogenated trimer acid | | | | | | |
| | Organic acid | Adipic acid | | | 3 | | | |
| | | Suberic acid | | | | | | |
| | | Glutaric acid | | | | | | |
| | | Stearic acid | | | | | | |
| | Amine | 2-Undecylimidazole | | | | | | |
| | Amine hydrohalide salt | N,N-Diethyl-aniline-HBr salt | | | | | | |
| | Organic Halogen compound | Triallyl isocyanurate hexabromide | | | | | | |

TABLE 1-continued

| | | | | | | | | |
|---|---|---|---|---|---|---|---|---|
| Solvent | | Butyl stearate | | | | | | |
| Additive | Antifoaming agent | Acrylic polymer | | | | | | |
| | Silicone oil | Dimethyl silicone oil | | | | | | |
| | Organophosphorus compound | Isodecyl acid phosphate | | | | | | |
| Wetting and spreading properties | | | ○ | ○ | ○ | ○ | ○ | ○ |
| Specific resistance of aqueous solution | | | ○ | ○ | ○ | ○ | ○ | ○ |
| Processability | | | ○ | ○ | ○ | ○ | ○ | ○ |
| Comprehensive evaluation | | | ○ | ○ | ○ | ○ | ○ | ○ |

| | Material | | Example 7 | Example 8 | Example 9 | Example 10 | Example 11 | Example 12 |
|---|---|---|---|---|---|---|---|---|
| Rosin | Natural rosin | Natural rosin | Bal | Bal | Bal | Bal | Bal | Bal |
| | Modified rosin | Polymerized rosin | | | | | | |
| | | Hydrogenated rosin | | | | | | |
| | | Hydrogenated polymerized rosin | | | | | | |
| | | Acid-modified rosin | | | | | | |
| | | Hydrogenated acid-modified rosin | | | | | | |
| | | Rosin ester | | | | | | |
| | Resin | Polyethylene | | | | | | |
| | | polyvinyl acecute copolymer | | | | | | |
| Activator | Dimer acid | Dimer acid | | 5 | | 5 | 3 | 3 |
| | | Hydrogenated dimer acid | | | 5 | | | |
| | | Trimer acid | | 5 | | | | |
| | | Hydrogenated trimer acid | 10 | | 5 | | | |
| | Organic acid | Adipic acid | | | | | | |
| | | Suberic acid | | | | 4 | | |
| | | Glutaric acid | | | | | 1 | |
| | | Stearic acid | | | | | | 4 |
| | Amine | 2-Undecylimidazole | | | | | | |
| | Amine hydrohalide salt | N,N-Diethyl-aniline-HBr salt | | | | | | |
| | Organic Halogen compound | Triallyl isocyanurate hexabromide | | | | | | |
| | Solvent | Butyl stearate | | | | | | |
| Additive | Antifoaming agent | Acrylic polymer | | | | | | |
| | Silicone oil | Dimethyl silicone oil | | | | | | |
| | Organophosphorus compound | Isodecyl acid phosphate | | | | | | |
| Wetting and spreading properties | | | ○ | ○ | ○ | ○ | ○ | ○ |
| Specific resistance of aqueous solution | | | ○ | ○ | ○ | ○ | ○ | ○ |
| Processability | | | ○ | ○ | ○ | ○ | ○ | ○ |
| Comprehensive evaluation | | | ○ | ○ | ○ | ○ | ○ | ○ |

| | Material | | Example 13 | Example 14 | Example 15 | Example 16 | Example 17 | Example 18 | Example 19 |
|---|---|---|---|---|---|---|---|---|---|
| Rosin | Natural rosin | Natural rosin | Bal | Bal | Bal | Bal | Bal | Bal | Bal |
| | Modified rosin | Polymerized rosin | | | | | | | |
| | | Hydrogenated rosin | | | | | | | |
| | | Hydrogenated polymerized rosin | | | | | | | |
| | | Acid-modified rosin | | | | | | | |
| | | Hydrogenated acid-modified rosin | | | | | | | |
| | | Rosin ester | | | | | | | |
| | Resin | Polyethylene | | | | | | | |
| | | polyvinyl acecute copolymer | | | | | | | |
| Activator | Dimer acid | Dimer acid | 3 | 3 | 3 | 3 | 3 | 3 | 3 |
| | | Hydrogenated dimer acid | | | | | | | |

-continued

| Material | | | | | | | | | | |
|---|---|---|---|---|---|---|---|---|---|---|
| | Organic acid | Trimer acid | | | | | | | | |
| | | Hydrogenated trimer acid | | | | | | | | |
| | | Adipic acid | 3 | 3 | | 3 | 3 | 3 | 3 | |
| | | Suberic acid | | | 3 | | | | | |
| | | Glutaric acid | | | | | | | | |
| | | Stearic acid | | | | | | | | |
| | Amine | 2-Undecylimidazole | 2 | | | | | | | |
| | Amine hydrohalide salt | N,N-Diethyl-aniline-HBr salt | | 1 | | | | | | |
| | Organic Halogen compound | Triallyl isocyanurate hexabromide | | | 5 | | | | | |
| | Solvent | Butyl stearate | | | | 13 | | | | |
| Additive | Antifoaming agent | Acrylic polymer | | | | | 3 | | | |
| | Silicone oil | Dimethyl silicone oil | | | | | | 5 | | |
| | Organophosphorus compound | Isodecyl acid phosphate | | | | | | | 10 | |
| Wetting and spreading properties | | | ○ | ○ | ○ | ○ | ○ | ○ | ○ | |
| Specific resistance of aqueous solution | | | ○ | ○ | ○ | ○ | ○ | ○ | ○ | |
| Processability | | | ○ | ○ | ○ | ○ | ○ | ○ | ○ | |
| Comprehensive evaluation | | | ○ | ○ | ○ | ○ | ○ | ○ | ○ | |

| Material | | | Example 20 | Comparative Example 1 | Comparative Example 2 | Comparative Example 3 | Comparative Example 4 | Comparative Example 5 |
|---|---|---|---|---|---|---|---|---|
| Rosin | Natural rosin | Natural rosin | Bal | Bal | Bal | Bal | Bal | Bal |
| | Modified rosin | Polymerized rosin | | | | | | |
| | | Hydrogenated rosin | | | | | | |
| | | Hydrogenated polymerized rosin | | | | | | |
| | | Acid-modified rosin | | | | | | |
| | | Hydrogenated acid-modified rosin | | | | | | |
| | | Rosin ester | | | | | | |
| | Resin | Polyethylene | 25 | | | | | |
| | | polyvinyl acecute copolymer | | | | | | |
| Activator | Dimer acid | Dimer acid | 40 | 0.1 | 50 | | | |
| | | Hydrogenated dimer acid | | | | | | |
| | | Trimer acid | | | | | | |
| | | Hydrogenated trimer acid | | | | | | |
| | Organic acid | Adipic acid | 3 | | | 10 | | |
| | | Suberic acid | | | | | 5 | |
| | | Glutaric acid | | | | | 5 | 5 |
| | | Stearic acid | | | | | | 5 |
| | Amine | 2-Undecylimidazole | | | | | | |
| | Amine hydrohalide salt | N,N-Diethyl-aniline-HBr salt | | | | | | |
| | Organic Halogen compound | Triallyl isocyanurate hexabromide | | | | | | |
| | Solvent | Butyl stearate | | | | | | |
| Additive | Antifoaming agent | Acrylic polymer | | | | | | |
| | Silicone oil | Dimethyl silicone oil | | | | | | |
| | Organophosphorus compound | Isodecyl acid phosphate | | | | | | |
| Wetting and spreading properties | | | ○ | × | ○ | ○ | ○ | ○ |
| Specific resistance of aqueous solution | | | ○ | ○ | ○ | × | × | × |
| Processability | | | ○ | ○ | × | ○ | ○ | ○ |
| Comprehensive evaluation | | | ○ | × | × | × | × | × |

In Example 1 including 10 wt % of a dimer acid which was a reaction product of oleic acid and linoleic acid within the range specified in the present invention and the balance of a rosin, the wetting and spreading ratio was 70% or more, thus providing the sufficient effect of wetting and spreading of the solder. In addition, the specific resistance of the aqueous solution was 500 Ωm or more and high specific resistance of the aqueous solution was maintained, thus providing the sufficient effect of improving the reliability by suppressing metal corrosion. Furthermore, the state at 25° C. was solid, thus providing the sufficient effect of the processability in manufacturing the resin flux cored solder. When one selected from natural rosin, polymerized rosin, hydrogenated rosin, hydrogenated polymerized rosin, acid-modified rosin, hydrogenated acid-modified rosin, rosin ester was used as a rosin within the range specified in the present invention or the total of two or more thereof was used within the range specified in the present invention, sufficient effects of the wetting and spreading of the solder, improvement in reliability, and the processability were also obtained.

In Example 2 including 1 wt % of a dimer acid which was a reaction product of oleic acid and linoleic acid, the amount of which was reduced within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 3 including 3 wt % of a dimer acid which was a reaction product of oleic acid and linoleic acid, the amount of which was reduced within the range specified in the present invention, further including 3 wt % of adipic acid as an organic acid within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 4 including 25 wt % of a dimer acid which was a reaction product of oleic acid and linoleic acid, the amount of which was increased within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 5 including 10 wt % of a hydrogenated dimer acid obtained by adding hydrogen to a dimer acid which was a reaction product of oleic acid and linoleic acid within the range specified in the present invention and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 6 including 10 wt % of a trimer acid which was a reaction product of oleic acid and linoleic acid within the range specified in the present invention and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 7 including 10 wt % of a hydrogenated trimer acid obtained by adding hydrogen to a trimer acid which was a reaction product of oleic acid and linoleic acid within the range specified in the present invention and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 8 including 5 wt % of a dimer acid which was a reaction product of oleic acid and linoleic acid, 5 wt % of a trimer acid which was a reaction product of oleic acid and linoleic acid, and the balance of a rosin, wherein the total amount of the dimer acid which was a reaction product of oleic acid and linoleic acid and the trimer acid which was a reaction product of oleic acid and linoleic acid was within the range specified in the present invention, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 9 including 5 wt % of a hydrogenated dimer acid obtained by adding hydrogen to a dimer acid which was a reaction product of oleic acid and linoleic acid, 5 wt % of a hydrogenated trimer acid obtained by adding hydrogen to a trimer acid which was a reaction product of oleic acid and linoleic acid, and the balance of a rosin, wherein the total amount of the hydrogenated dimer acid obtained by adding hydrogen to the dimer acid which was a reaction product of oleic acid and linoleic acid and the hydrogenated trimer acid obtained by adding hydrogen to the trimer acid which was a reaction product of oleic acid and linoleic acid was within the range specified in the present invention, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 10 including 5 wt % of a dimer acid which was a reaction product of oleic acid and linoleic acid within the range specified in the present invention, further including 1 wt % of glutaric acid as an organic acid within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the process ability was obtained.

In Example 11 including 3 wt % of a dimer acid which was a reaction product of oleic acid and linoleic acid within the range specified in the present invention, further including 4 wt % of suberic acid as an organic acid within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the process ability was obtained.

In Example 12 including 3 wt % of a dimer acid which was a reaction product of oleic acid and linoleic acid within the range specified in the present invention, further including 4 wt % of stearic acid as an organic acid within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 13 including 3 wt % of a dimer acid which was a reaction product of oleic acid and linoleic acid within the range specified in the present invention, further including 3 wt % of adipic acid as an organic acid within the range specified in the present invention, further including 2 wt % of 2-undecylimidazole as an amine within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 14 including 3 wt % of a dimer acid which was a reaction product of oleic acid and linoleic acid within the range specified in the present invention, further including 3 wt % of adipic acid as an organic acid within the range specified in the present invention, further including 1 wt % of N,N-diethylaniline·HBr salt as an amine hydrohalide salt within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 15 including 3 wt % of a dimer acid which was a reaction product of oleic acid and linoleic acid within the range specified in the present invention, further including 3 wt % of suberic acid as an organic acid within the range specified in the present invention, further including 5 wt % of triallyl isocyanurate hexabromide as an organic halogen compound within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 16 including 3 wt % of a dimer acid which was a reaction product of oleic acid and linoleic acid within the range specified in the present invention, further including 3 wt % of adipic acid as an organic acid within the range specified in the present invention, further including 13 wt % of butyl stearate as a solvent within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 17 including 3 wt % of a dimer acid which was a reaction product of oleic acid and linoleic acid within the range specified in the present invention, further including 3 wt % of adipic acid as an organic acid within the range specified in the present invention, further including 3 wt % of acrylic polymer as an antifoaming agent within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 18 including 3 wt % of a dimer acid which was a reaction product of oleic acid and linoleic acid within the range specified in the present invention, further including 3 wt % of adipic acid as an organic acid within the range specified in the present invention, further including 5 wt % of dimethyl silicone oil as a silicone oil within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 19 including 3 wt % of a dimer acid which was a reaction product of oleic acid and linoleic acid within the range specified in the present invention, further including 3 wt % of adipic acid as an organic acid within the range specified in the present invention, further including 10 wt % of isodecyl acid phosphate as an organophosphorus compound within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In Example 20 including 40 wt % of a dimer acid which was a reaction product of oleic acid and linoleic acid within the range specified in the present invention, including 25 wt % of polyethylene polyvinyl acetate copolymer as the another resin within the range specified in the present invention, further including 3 wt % of adipic acid as an organic acid within the range specified in the present invention, and the balance of a rosin, the sufficient effect of wetting and spreading of the solder was also obtained. In addition, high specific resistance of the aqueous solution was maintained, thus providing the sufficient effect of improving the reliability. Furthermore, the sufficient effect of the processability was obtained.

In contrast, even when a dimer acid which was a reaction product of oleic acid and linoleic acid was included, in Comparative Example 1 including 0.1 wt % of the dimer acid which was a reaction product of oleic acid and linoleic acid, which was less than the range specified in the present invention, and the balance of a rosin, the effect of improving the reliability and the effect of the processability were obtained, but the wetting and spreading ratio was less than 70% and the insufficient effect of the wetting and spreading of the solder was thus obtained.

Even when a dimer acid which was a reaction product of oleic acid and linoleic acid was included, in Comparative Example 2 including 50 wt % of the dimer acid which was a reaction product of oleic acid and linoleic acid, which was more than the range specified in the present invention, and the balance of a rosin, the effect of wettability and the effect of improving the reliability were obtained, but the status at 25° C. was liquid and the insufficient effect of the processability in manufacturing a resin flux cored solder was thus obtained.

In Comparative Example 3 including none of a dimer acid which was a reaction product of oleic acid and linoleic acid, a trimer acid which was a reaction product of oleic acid and linoleic acid, a hydrogenated dimer acid obtained by adding hydrogen to a dimer acid which was a reaction product of oleic acid and linoleic acid, or a hydrogenated trimer acid obtained by adding hydrogen to a trimer acid which was a reaction product of oleic acid and linoleic acid; including 10 wt % of adipic acid as an organic acid, which was more than the range specified in the present invention; and the balance of a rosin, the effect of the wettability of the solder and the effect of the processability were obtained, but the specific resistance of the aqueous solution was reduced and the insufficient effect of the reliability was thus obtained.

In Comparative Example 4 including none of a dimer acid which was a reaction product of oleic acid and linoleic acid, a trimer acid which was a reaction product of oleic acid and linoleic acid, a hydrogenated dimer acid obtained by adding hydrogen to a dimer acid which was a reaction product of oleic acid and linoleic acid, or a hydrogenated trimer acid obtained by adding hydrogen to a trimer acid which was a reaction product of oleic acid and linoleic acid; including 5 wt % of suberic acid and 5 wt % of glutaric acid as organic acids, and the total amount of the other organic acids which was more than the range specified in the present invention; and the balance of a rosin, the effect of the wettability of the solder and the effect of the processability were also obtained, but the insufficient effect of the reliability was thus obtained.

In Comparative Example 5 including none of a dimer acid which was a reaction product of oleic acid and linoleic acid, a trimer acid which was a reaction product of oleic acid and linoleic acid, a hydrogenated dimer acid obtained by adding hydrogen to a dimer acid which was a reaction product of oleic acid and linoleic acid, or a hydrogenated trimer acid obtained by adding hydrogen to a trimer acid which was a reaction product of oleic acid and linoleic acid; including 5 wt % of glutaric acid and 5 wt % of stearic acid as organic acids, and the total amount of the other organic acids which was more than the range specified in the present invention; and the balance of a rosin, the effect of the wettability of the solder and the effect of the processability were also obtained, but the insufficient effect of the reliability was thus obtained.

As a result, the good effect of the wetting and spreading of the solder was obtained for the resin composition for soldering including 1 wt % or more and 40 wt % or less of: any of a dimer acid which was a reaction product of oleic acid and linoleic acid, a trimer acid which was a reaction product of oleic acid and linoleic acid, a hydrogenated dimer acid obtained by adding hydrogen to a dimer acid which was a reaction product of oleic acid and linoleic acid, or a hydrogenated trimer acid obtained by adding hydrogen to a trimer acid which was a reaction product of oleic acid and linoleic acid; or a total of two or more of a dimer acid which was a reaction product of oleic acid and linoleic acid, a trimer acid which was a reaction product of oleic acid and linoleic acid, a hydrogenated dimer acid obtained by adding hydrogen to a dimer acid which was a reaction product of oleic acid and linoleic acid, and a hydrogenated trimer acid obtained by adding hydrogen to a trimer acid which was a reaction product of oleic acid and linoleic acid; and 30 wt % or more and 99 wt % or less of a rosin, the resin flux cored solder and the flux coated solder using this resin composition for soldering, and the liquid flux obtained by diluting this resin composition for soldering with a solvent. In addition, high specific resistance of the aqueous solution was maintained, thus providing the effect of improving the reliability. Furthermore, the effect of the good processability was obtained.

These effects were not inhibited even by the inclusion of the another resin or the other organic acids, amine, amine hydrohalide salt, and organic halogen compound as the activator within the range specified in the present invention. In addition, such inhibition did not occur even by the inclusion of a rosin, a solvent, and an additive within the range specified in the present invention.

The invention claimed is:
1. A flux for soldering consisting of:
a total amount of 1 wt % or more and 40 wt % or less of a dimer acid, a trimer acid, or a combination thereof;
30 wt % or more and 99 wt % or less of a rosin;
0 wt % or more and 13 wt % or less of a solvent;
0 wt % or more and 4 wt % or less of an organic acid;
0 wt % or more and 2 wt % or less of an amine;
0 wt % or more and 5 wt % or less of an organic halogen compound;
0 wt % or more and 1 wt % or less of an amine hydrohalide salt;
0 wt % or more and 3 wt % or less of an antifoaming agent;
0 wt % or more and 5 wt % or less of a silicone oil;
0 wt % or more and 10 wt % or less of an organophosphorus compound; and
0 wt % or more and 40 wt % or less of an additional resin,
wherein the dimer acid is selected from a dimer acid which is a reaction product of oleic acid and linoleic acid, a hydrogenated dimer acid obtained by adding hydrogen to a dimer acid which is a reaction product of oleic acid and linoleic acid, and a combination thereof,
the trimer acid is selected from a trimer acid which is a reaction product of oleic acid and linoleic acid, a hydrogenated trimer acid obtained by adding hydrogen to a trimer acid which is a reaction product of oleic acid and linoleic acid, and a combination thereof,
the additional resin is selected from the group consisting of: a terpene resin, a modified terpene resin, a terpene phenol resin, a modified terpene phenolic resin, a xylene resin, a modified xylene resin, polyvinyl acetate, polyvinyl alcohol, polyethylene polyvinyl acetate copolymer, and combinations thereof, and
the solvent is selected from the group consisting of: water, butyl stearate, 2-ethylhexyl stearate, isotridecyl stearate, methyl oleate, isobutyl oleate, coconut fatty acid methyl, methyl laurate, isopropyl myristate, isopropyl palmitate, 2-ethylhexyl palmitate, octyldodecyl myristate, ethanol, mixed solvent obtained by adding methanol and/or isopropyl alcohol to ethanol, isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexanedimethanol, erythritol, threitol, guaiacol glycerol ether, 3,6-dimethyl-4-octyne-3,6-diol, 2,4,7,9-tetramethyl-5-decyne-4,7-diol, hexyldiglycol, diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, and combinations thereof.

2. A resin flux cored solder, wherein
a linear solder is filled with the flux for soldering according to claim 1.

3. A flux coated solder, wherein
a solder is coated with the flux for soldering according to claim 1.

* * * * *